United States Patent
Parakala et al.

(10) Patent No.: US 12,058,028 B2
(45) Date of Patent: Aug. 6, 2024

(54) METHOD AND SYSTEM TO PREVENT MICRO-LOOPS DURING A NETWORK TOPOLOGY CHANGE

(71) Applicant: Telefonaktiebolaget LM Ericsson (publ), Stockholm (SE)

(72) Inventors: Naga Sricharan Parakala, Bangalore (IN); Satheesh Kumar Karra, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 234 days.

(21) Appl. No.: 17/423,388

(22) PCT Filed: Jan. 24, 2019

(86) PCT No.: PCT/IN2019/050055
§ 371 (c)(1),
(2) Date: Jul. 15, 2021

(87) PCT Pub. No.: WO2020/152692
PCT Pub. Date: Jul. 30, 2020

(65) Prior Publication Data
US 2022/0070084 A1    Mar. 3, 2022

(51) Int. Cl.
*H04L 45/18* (2022.01)
*H04L 45/00* (2022.01)
(Continued)

(52) U.S. Cl.
CPC .............. *H04L 45/18* (2013.01); *H04L 45/02* (2013.01); *H04L 45/12* (2013.01); *H04L 45/22* (2013.01)

(58) Field of Classification Search
CPC ......... H04L 45/18; H04L 45/02; H04L 45/12; H04L 45/22; H04L 12/4637; H04L 45/28; H04L 45/745; H04L 45/122
See application file for complete search history.

(56) References Cited

U.S. PATENT DOCUMENTS

| 7,986,640 B2 * | 7/2011 | Previdi | H04L 45/22 370/254 |
| 2010/0172237 A1 * | 7/2010 | Savage | H04L 45/28 370/228 |

(Continued)

FOREIGN PATENT DOCUMENTS

| CN | 101529829 A | 9/2009 |
| CN | 101931583 A * | 12/2010 |

(Continued)

OTHER PUBLICATIONS

Bashandy et al., "Topology Independent Fast Reroute using Segment Routing: draft-bashandy-rtgwg-segment-routing-ti-lfa-04", Network Working Group, Mar. 30, 2018, pp. 1-18.

(Continued)

*Primary Examiner* — Ayaz R Sheikh
*Assistant Examiner* — Louis Samara
(74) *Attorney, Agent, or Firm* — NICHOLSON DE VOS WEBSTER & ELLIOTT LLP (57) ABSTRACT

Methods and systems to prevent micro-loops between two network devices when there is a change in network topology. In one embodiment, a method is performed by a network device in a communications network, the method comprising computing a shortest path from the network device to a destination network device and identifying a backup network device for the network device to the destination network device, where the backup network device is a neighboring network device of the network device and is on an alternative path to the destination network device. The method further comprises determining a packet destined to the destination network device is received from a downstream network device of the network device, where the downstream network device is closer than the network device on the shortest path to the destination network device, (Continued)

and forwarding the packet to the backup network device based on the determination.

20 Claims, 6 Drawing Sheets (51) Int. Cl.
*H04L 45/02* (2022.01)
*H04L 45/12* (2022.01)

(56) References Cited

U.S. PATENT DOCUMENTS

| | | | | |
|---|---|---|---|---|
| 2010/0189113 | A1* | 7/2010 | Csaszar | H04L 45/28 370/400 |
| 2014/0078927 | A1* | 3/2014 | Thubert | H04L 12/4637 370/254 |
| 2015/0023156 | A1* | 1/2015 | Csaszar | H04L 45/22 370/228 |
| 2015/0138961 | A1* | 5/2015 | Wijnands | H04L 41/0668 370/228 |
| 2015/0350062 | A1* | 12/2015 | Lindem, III | H04L 45/22 370/220 |
| 2016/0028612 | A1 | 1/2016 | Allan et al. | |
| 2016/0156545 | A1* | 6/2016 | Császár | H04L 41/12 370/238 |
| 2017/0093695 | A1* | 3/2017 | Kebler | H04L 67/535 |
| 2018/0077051 | A1* | 3/2018 | Nainar | H04L 45/745 |
| 2019/0007305 | A1* | 1/2019 | Filsfils | H04L 45/44 |

FOREIGN PATENT DOCUMENTS

| | | | | |
|---|---|---|---|---|
| CN | 104012051 A | | 8/2014 | |
| CN | 105052093 A | * | 11/2015 | H04L 45/02 |
| CN | 105052093 A | | 11/2015 | |
| CN | 107770063 A | | 3/2018 | |
| WO | WO-2013067111 A1 | * | 5/2013 | H04L 45/122 |
| WO | 2018/033060 A1 | | 2/2018 | |

OTHER PUBLICATIONS

International Search Report and Written Opinion, PCT App. No. PCT/IN2019/050055, May 7, 2019, 8 pages.
Shand et al., "A Framework for Loop-Free Convergence", Internet Engineering Task Force (IETF), Request for Comments: 5715, Jan. 2010, pp. 1-22.
European Search Report and Search Opinion, EP App. No. 19911675.7, Dec. 21, 2021, 8 pages.
International Preliminary Report on Patentability, PCT App. No. PCT/IN2019/050055, Aug. 5, 2021, 6 pages.
Office Action, CN App. No. 201980090224.7, Aug. 16, 2022, 12 pages (5 pages of Original document and 7 pages of English translation).
Search Report, CN App. No. 201980090224.7, Aug. 10, 2022, 3 pages.

* cited by examiner

Forwarding Table Entry at Node N 502

```
Prefix      Nexthop     Interface
D           S           to_S        ⟵ Primary Interface 512
+           C           to_C        ⟵ Backup Interface 514
```

Compute a plurality of backup network devices for the network device to the destination network device. 602

↓

Identify, from the plurality of the backup network devices, the backup network device that costs least in forwarding to the destination network device (e.g., cost least being a downstream LFA). 604

↓

Identify the backup network device with a least or highest address value when two or more backup network devices have a same least cost. 606

METHOD AND SYSTEM TO PREVENT MICRO-LOOPS DURING A NETWORK TOPOLOGY CHANGE

CROSS-REFERENCE TO RELATED APPLICATIONS

This application is a National stage of International Application No. PCT/IN2019/050055, filed Jan. 24, 2019, which is hereby incorporated by reference.

TECHNICAL FIELD

Embodiments of the present disclosure relate to the field of networking, and more specifically, relate to methods and systems to prevent micro-loops during a network topology change.

BACKGROUND ART

Network topology may change during operations. For example, a network device in the network may operate abnormally, or a link in the network may go down. When such abnormality happens, the network device or the link may no longer be able to forward traffic, and they become an inactive node or link in the new network topology. Once network topology is updated, traffic may need to be re-routed. A network device that detects the abnormality will try to recover, and it propagates the event around the network and also recomputes the paths to be used for forwarding packets to all destinations in the new topology.

During this transition, packets may travel in a loop between two or more network devices due to inconsistent views of the network devices about the topology, and the view inconsistency is the result of the difference in time taken to honor the transition process. The loop is referred to as a micro-loop (also referred to as microloop or uloop), and it causes traffic loss upon a network change during the convergence time of a routing information exchange protocol (e.g., interior gateway protocol (IGP)). It is desirable to prevent micro-loops in packet forwarding during a network topology change.

SUMMARY

Embodiments of the invention offer efficient ways to prevent micro-loops between two network devices when there is a change in network topology. Embodiments of the invention include methods to prevent the micro-loops. In one embodiment, a method is performed by a network device in a communications network, the method comprising computing a shortest path from the network device to a destination network device and identifying a backup network device for the network device to the destination network device, where the backup network device is a neighboring network device of the network device and is on an alternative path to the destination network device. The method further comprises determining a packet destined to the destination network device is received from a downstream network device of the network device, where the downstream network device is closer than the network device on the shortest path to the destination network device, and forwarding the packet to the backup network device based on the determination.

Embodiments of the invention include network devices to prevent micro-loops between two network devices when there is a change in network topology. In one embodiment, a network comprises a processor and computer-readable storage medium that provides instructions that, when executed by the processor, cause the network device to perform the following: computing a shortest path from the network device to a destination network device and identifying a backup network device for the network device to the destination network device, where the backup network device is a neighboring network device of the network device and is on an alternative path to the destination network device; determining a packet destined to the destination network device is received from a downstream network device of the network device, where the downstream network device is closer than the network device on the shortest path to the destination network device; and forwarding the packet to the backup network device based on the determination.

Embodiments of the invention include computer-readable storage media that provide instructions (e.g., computer program) that, when executed by a processor of an electronic device, cause the electronic device to perform operations comprising one or more methods of the embodiments of the invention.

Through using a backup network device (e.g., a loop-free alternate), a network device may prevent micro-loops in packet forwarding during a network topology change without resorting to extra signaling. The backup network device may be computed before the network topology change thus no additional computation is required when fast re-route (FRR) is supported. Embodiments of the invention do not differentiate local and remote micro-loops, and the unified solution is more efficient than prior approaches that deals local and remote micro-loops differently.

BRIEF DESCRIPTION OF THE DRAWINGS

The invention may best be understood by referring to the following description and accompanying drawings that illustrate embodiments of the invention.

DETAILED DESCRIPTION

The following description describes methods, apparatus, and computer programs to prevent micro-loops during a network topology change. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits, and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A network device (ND) (also referred to as a network node or node, and these terms are used interchangeably in this disclosure) is an electronic device in a communications network. The network device (e.g., a router, switch, and bridge) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN)

switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players. GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

Unicast is to send a packet to a single destination node identified by a unique individual address (e.g., an IP/MAC address), while multicast is to send a packet to a plurality of destination nodes simultaneously from a single source node where a unique group address identifies the set of recipients. Packet forwarding discussed in this disclosure is unicast packet forwarding unless noted otherwise.

Packet forwarding in a communications network may use a spanning tree or shortest path tree. The packet forwarding is often referred to as shortest path first (SPF) forwarding. Various SPF algorithms are known in the art, including Dijkstra's algorithm, Bellman-Ford algorithm, A* search algorithm, Floyd-Warshall algorithm, Johnson's algorithm, and Viterbi algorithm. Note that weights may be added along different paths in the SPF algorithms to determine the shortest path.

A root node (or "root") is the central node (also referred to as the topmost node) of a spanning tree or shortest path tree. For unicast packet forwarding, the root is the destination node, while for multicast packet forwarding, the root is the source node. For a node computing unicast packet forwarding paths (referred to as the "computing node"), an upstream node is a node that is further from a root than the computing node. A downstream node is a node that is closer to a root than the computing node. A point of local repair (PLR) is a node that detects a network condition and/or initiates a network topology change.

When multiple equal-cost routes to a root exist, each shortest path tree is an equal cost tree (ECT) to the root, and an ECT may also be referred to as an equal cost multi-tree (ECMT). A computing node may use specified tie breaking algorithms in the construction of a specific ECT. A backup node of a computing node is a neighboring node (coupled to the computing node through a link of a network) of the computing node. It is not on a current shortest path tree of the computing node to a given root, but nevertheless on a path to the root. A backup node may be a loop-free alternate (LFA) node of the computing node for a root node. Several types of LFA nodes are discussed in more details below.

Micro-Loop/Congestion Duration Network Topology Change

Figure 1A:
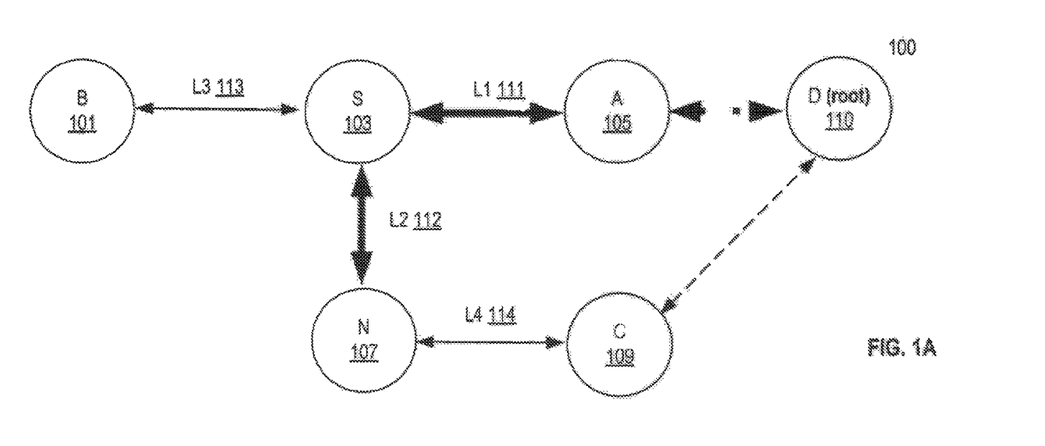
FIG. 1A shows a network topology per one embodiment.

FIG. 1A shows a network topology per one embodiment. Network 100 contains six nodes, nodes A-D, N, and S. While each node may be a root node to which packets are forwarded, in this example, node D at reference 110 is designated as the root node for other nodes (computing nodes) to determine their respective paths. Once a computing node receives a packet destined to node D, it forwards the packet based on the determined path (e.g., SPF path) towards node D. Note that node B is the backup node of node S for the root node D. The backup node may be determined when the SPF path of node S to node D is computed. The backup node determination along with SPF computation is common in some scenarios (e.g., when fast re-route (FRR) is supported).

Several links are shown in the network 100, including links L1-L4 at references 111-114. The bold-line links are the links to forward packets from nodes S and N to node D. For node S, the packets destined to node D are forwarded to the link L1 at reference 111; and for node N, the packets destined to node D are forwarded to the link L2 at reference 112 and then to the link L1. Note for the root node D, node N is an upstream node of node S and node S is the upstream node of node A. Packets are forwarded from upstream nodes to downstream nodes until reaching the root node in unicast.

A node may maintain a forwarding table for forwarding packets. The forwarding table may be a forwarding information base (FIB), a routing information base (RIB), a content-addressable memory (CAM) table, or their proprietary variations. A packet may be forwarded based on its addresses (e.g., source/destination IP/MAC addresses), sources/destination transmission control protocol (TCP)/ user datagram protocol (UDP) ports, and/or protocol type. For example, a subnet mask (e.g., the routing prefix) of a destination IP address in the packet header is used to determine the packet forwarding in one embodiment of the invention. Yet the embodiments of the invention are not limited to a particular way that a packet is forwarded towards its destination node. A plurality of packets whose headers match a given pattern may form a traffic flow. The packets in the traffic flow destined to the same destination (root node) may follow the same path when they are forwarded in a network.

Figure 1B:
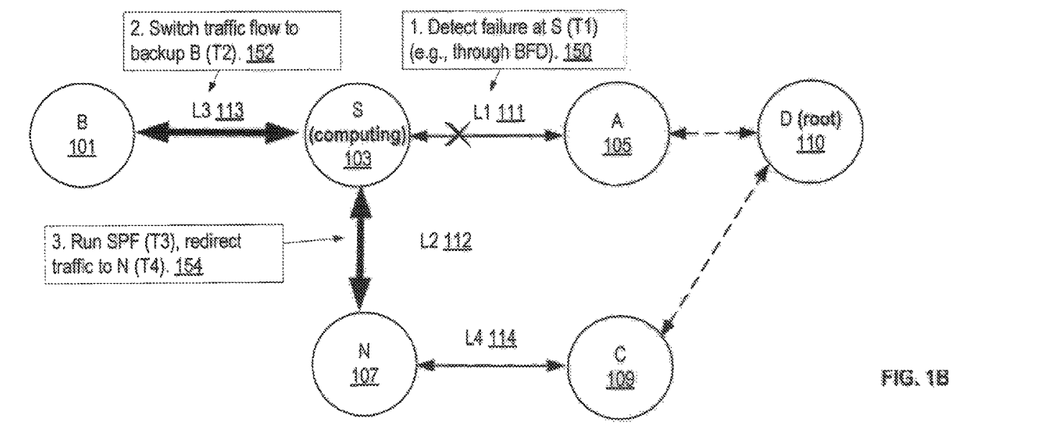
FIG. 1B shows operations of a point of local repair (PLR) in a network.

In FIG. 1A, the network operates in a stable state. As each computing node has a consistent view of the network topology, the forwarding tables at these nodes are consistent, and packets are forwarded to their respective destinations without error. Yet when a failure occurs to the network, different computing nodes will have different view of the network. FIG. 1B shows operations of a point of local repair (PLR) in a network. Task boxes 1-3 illustrate the order in which operations are performed. At task box 1 (reference 150), node S detects the link failure of L1 at time T1. The detection may be through a bidirectional failure (BFD) in one embodiment. Upon the detection, node S switches its traffic flow destined to node D to its backup node, node B at task box 2 (reference 152). The traffic flow switch may be performed within 50 milliseconds (ms) (i.e., T2-T1≤50 ms).

Based on the topology update due to the detected failure, node S recomputes its paths to various nodes in the network, including the one to node D at task box 3 (reference 154). In this example, node S runs its SPF computation at time T3, and determines that its SPF path to node D is through link L2 at reference 112. Node S then switches its traffic flow destined to node D to node N at time T4.

Figure 1C:
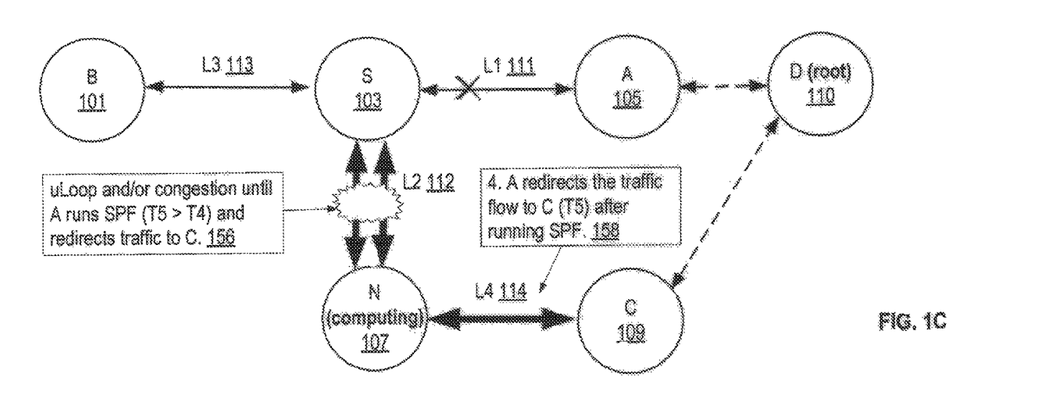
FIG. 1C shows operations of a node upon receiving packets from a downstream node.

FIG. 1C shows operations of a node upon receiving packets from a downstream node. The operations of node N follow the operations of node S, and task box 4 is so numbered to illustrate the order in which operations are performed at node S relating to the operations of node S. Upon the PLR (node S in this example) detecting the link failure, it propagates the event around the network. The event propagation is through link state information exchanges in one embodiment (e.g., using interior gateway protocol (IGP)). For example, node S may transmit a digest of the link state information as it perceives (the link state information reflects the network topology after the detection of the link failure) to node N. Node N compares the received link state information to its local copy (which reflects the network topology prior to the link failure), notices the difference, and then recomputes its paths to various nodes, including the one to node D at task box 4 (reference 158). In this example, node N runs its SPF computation, and determines that its SPF path to node D is through link L4 at reference 114. Node N then redirects the traffic flow destined to node D to node C at time T5.

Because the time to re-compute the network topology update by node S is typically faster than the time it takes for node N to be notified of the topology update and to re-compute its paths, time T5 is typically later than time T4. Prior to time T5, node N therefore still has the view of the network topology prior to the link failure, where node S is a downstream node of node N to the root node D. Thus, node N will send packets received from node S (which has already redirected the packets for node D to node N due to the topology change after time T4) back to node S.

Thus, after T4 and prior to T5, packets destined to node D will be looped between nodes S and N on the link L2. The packets destined to node D will be looped on the link L2 and not forwarded to the destination node D until time T5 (or until time to live (TTL) count expires). The loop also causes link L2 to be congested and affects traffic that is forwarded properly on the link, as shown at reference 156. Note that in some embodiments, reverse path forwarding (RPF) is implemented, where a packet will not be forwarded back to an interface from which the packet is received. In that case, the packet destined to node D is dropped at node N prior to time T5.

The loop at link L2 is a micro-loop for packet forwarding destined to node D, and it degrades the network forwarding performance and may cause the breach of a customer service level agreement (SLA). For example, the SLA may include a quality of service (QoS) requirement indicating the maximum packet loss and/or traffic outage duration. The micro-loop may cause the packet forwarding to violate the QoS requirements. It is desirable to minimize the impact of micro-loop prior to all computing nodes completing their network topology update (e.g., through link state update messages between nodes) and the network completing its convergence.

Various approaches have taken to reduce/remove micro-loops. For example, the PLR node (node S in this example) may delay its redirection of traffic flow for node D to node N at a time later than when it finishes its network topology update (e.g., delay a Td after T4) so that the upstream node N in the "old" network topology (which is prior to the link failure) may compute its network topology update and identify the shortest path post the link failure. The delay needs to be long enough (T4+Td>T5). Yet it is hard to determine the optimal value of the delay: Too short a Td, micro-loops may still be formed and too long a Td, the network performance suffers as too many packets in the traffic flow are delayed.

Other approaches further categorize micro-loops as local micro-loops and remote loops. A local micro-loop is formed at a node directly attached to a link that is being updated (going down or up) such as node S. A remote micro-loop is formed at a node that is not directly attached to the link that is being updated (e.g., node C). Some approaches apply to the remote micro-loops while others to the local micro-loops. It is desirable to have a unified approach regardless of the location of the micro-loops.

Micro-Loop Avoidance Using Backup Node

Figure 2A:
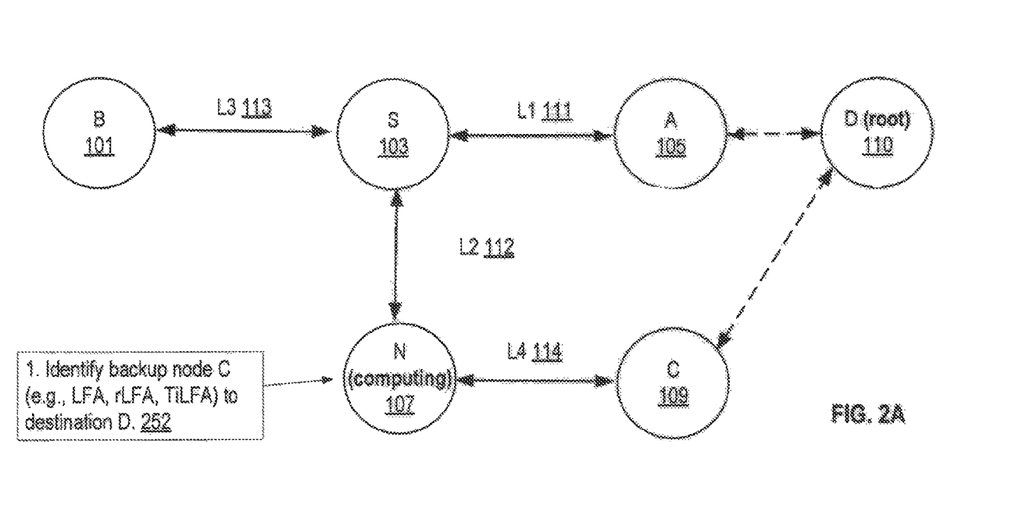
FIG. 2A shows the identification of a backup node per one embodiment of the invention.

Embodiments of the invention use backup nodes that are precomputed to avoid micro-loops during a network topology change. FIG. 2A shows the identification of a backup node per one embodiment of the invention. A computing node identifies its backup node(s) to a given destination node. The identification may be performed when the network is in a stable state, prior to a network topology change. For example, the computation/identification may be performed when the SPF path is computed. The computation/identification may be a part of IP fast re-route (FRR). In an alternative embodiment, the computation/identification may be performed during a network topology change.

At task box 1 (reference 252), the computing node N identifies the backup node C to the destination node D. The backup node may be a loop-free alternate (LFA) node, a remote LFA (rLFA) node, or a topology independent LFA (Ti-LFA) node of the computing node N. The different types of LFA nodes are discussed in more details below.

Figure 2B:
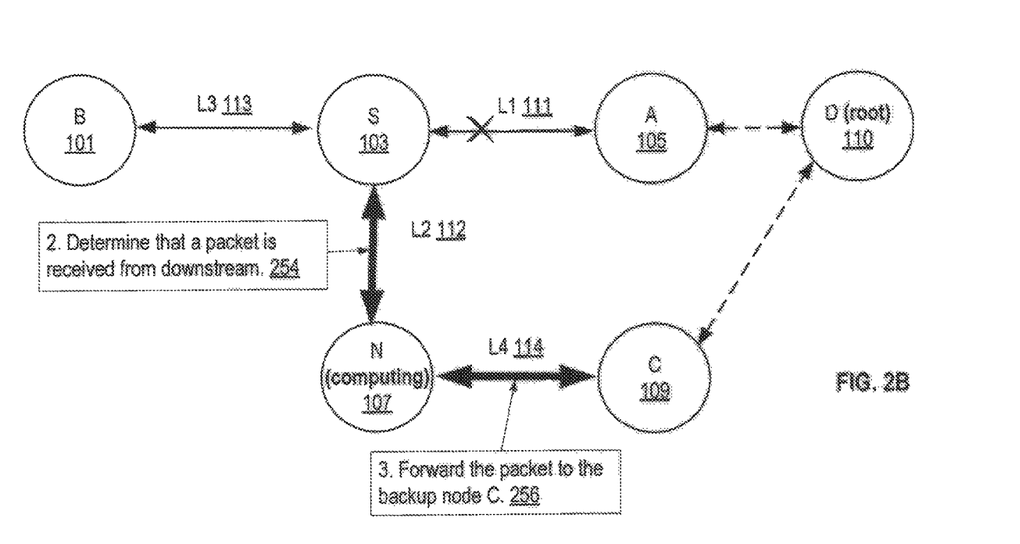
FIG. 2B shows the packet forwarding using a backup node per one embodiment of the invention.

FIG. 2B shows the packet forwarding using a backup node per one embodiment of the invention. Two task boxes are shown in FIG. 2B and task boxes 2-3 are so numbered to illustrate the order in which operations are performed in FIG. 2B relating to the operations in FIG. 2A.

At task box 2, node N determines that a packet (e.g., destined to node D) is received from a downstream node. Since packets are forwarded downstream towards the destination node, it is abnormal that a node would receive the packet from a downstream node. Yet as explained earlier relating to FIG. 1C, a packet may be forwarded from a downstream node during a topology change (e.g., L1 link failure at reference 111).

At task box 3, node N forwards the packet received from the downstream node to its identified backup node, node C. The forwarding to the backup node does not depend on its detection of the topology change and/or the SPF path computation, thus it may be instantaneous upon determining the packet being received from a downstream node. The backup node may be selected as a type of LFA node thus the packet may be forwarded onto a loop free path to the destination.

By forwarding the packet to the backup node, the packet won't get lost in a micro-loop and it will be forwarded onto a path to the destination node. Thus, prior to the network convergence and node N finishing its SPF path computation, packets forwarded from a downstream node are not lost. The identification of the backup node may be a part of SPF path computation; thus, using the backup node does not add computation to the packet route computation. Additionally, forwarding a packet received from a downstream node is an approach agnostic of local or remote micro-loops, thus it is easier to implement than prior approaches where local and remote micro-loops are resolved differently.

Various Types of Loop-Free Alternate (LFA) Nodes

As discussed, a backup node may be one type of LFA node. Several types of LFA nodes have been proposed. A regular LFA node (also referred to as a classical LFA node) of a computing node to a destination node is a neighboring node of the computing node and is on a loop-free path to the destination node. The computing node may have multiple regular LFA nodes to the destination node because it may have multiple ECTs to the destination node. The regular LFA nodes may be pre-computed by the IGP per destination node (e.g., based on the prefix of the destination node), and they may be installed in the data plane (e.g., in a forwarding table) of the computing node.

A regular LFA node may not offer full coverage (may not have LFA for some destination nodes) and it may not provide the optimal backup path to a destination node. A topology independent LFA (Ti-LFA) node is a variation of LFA node that prevents transient congestion and suboptimal backup path to a destination node. To identify Ti-LFA nodes, a computing node determines a loop-free post-convergence path to the destination node. The loop-free post-convergence path may be identified using a list of segments. The packet forwarding using the list of segments is referred to as segment routing.

Figure 3A:
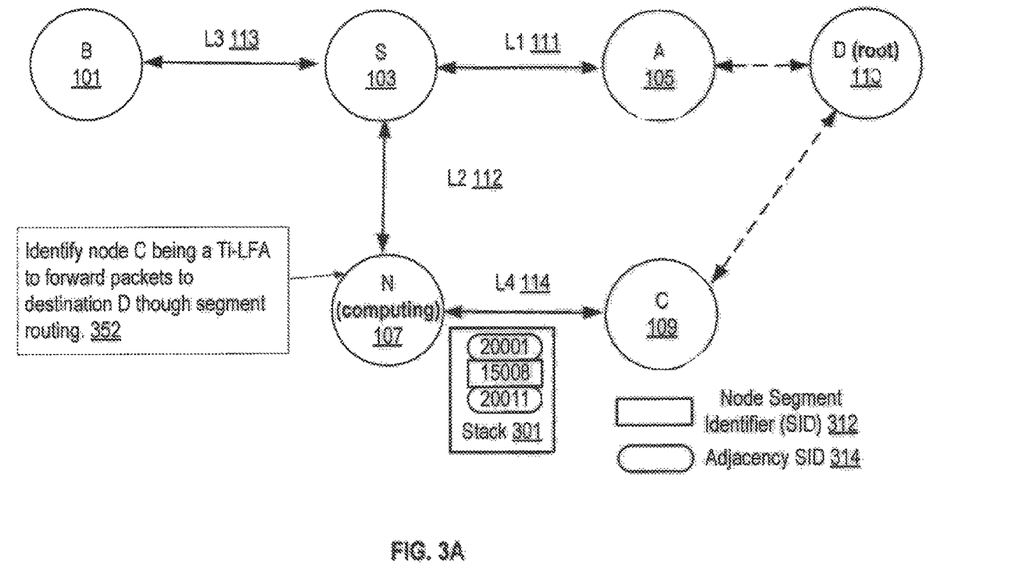
FIG. 3A shows a Ti-LFA node forwarding packets through segment routing (SR) per one embodiment of the invention.

FIG. 3A shows a Ti-LFA node forwarding packets through segment routing (SR) per one embodiment of the invention. Node N may identify a Ti-LFA node (node C) post-convergence to the destination node D. To forward packets through the Ti-LFA node, node N determines a stack 301, which lists nodes and links in the path to the destination node. A node in the stack 301 is identified using a node segment identifier (SID) 312, and a link is identified using an adjacency SID 314. The node and adjacency SIDs in the stack 301 together identify a loop-free post-convergence path. At reference 352, node N identifies node C being the Ti-LFA node to forward packets to the destination node through segment routing.

Figure 3B:
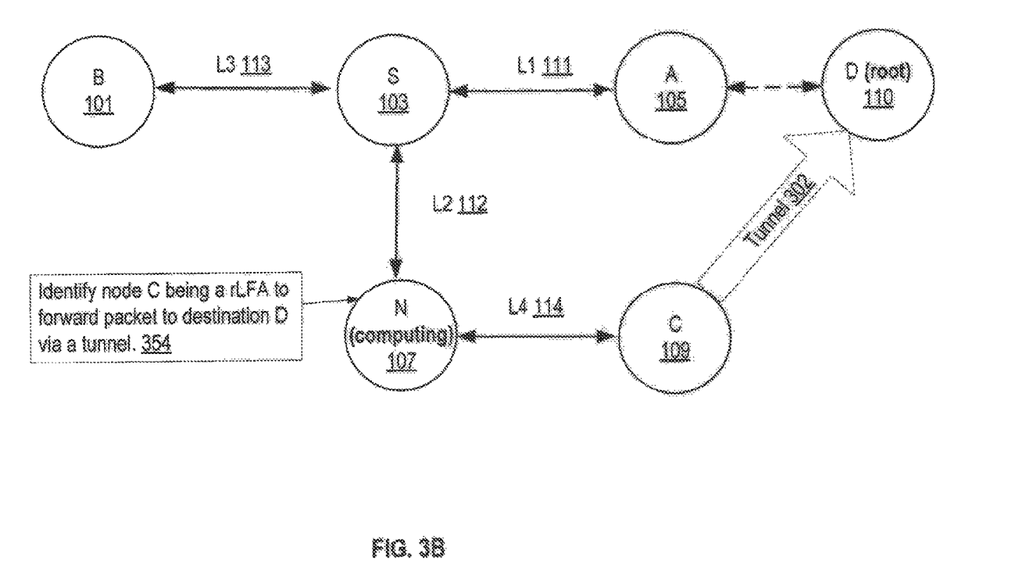
FIG. 3B shows a remote LFA node forwarding packets through tunneling per one embodiment of the invention.

Another type of backup node is remote LFA (rLFA) node. An rLFA node is applicable when a regular LFA node is not available, and packets may be tunneled to a remote node that can still deliver traffic to the destination node within a predetermined time (e.g., within 50 ms). FIG. 3B shows a remote LFA node forwarding packets through tunneling per one embodiment of the invention. When no LFA node is available at node N for the destination node D, node N may identify node C being a rLFA node to forward packets to destination node D through tunneling at reference 354. In this case, when packets destined to node D are forwarded to node C, node C will tunnel the packets through tunnel 302 and forward towards node D.

Other than these and other types of LFA nodes, node N may have other backup nodes to a root node. These backup nodes may be computed prior to a network topology change. Upon a topology change, node N may select one backup node from the multiple backup nodes to forward packets received from a downstream node based on some defined criteria.

For example, node N may select one backup node that costs least to the root node. The least cost backup node may be a LFA node on the downstream path to the root. The least cost backup node may also be a node that on the post-convergence path (i.e., a Ti-LFA node) so that once the network convergence completes, the packets no longer need to be redirected to another node. When two or two backup nodes have the least cost to the root, node N may select one node based on the (IP/MAC) address values of the backup nodes, e.g., selecting the backup node with the least or highest address value.

Operations to Forward Downstream Packets to Backup Node Per Some Embodiments

Figure 4:
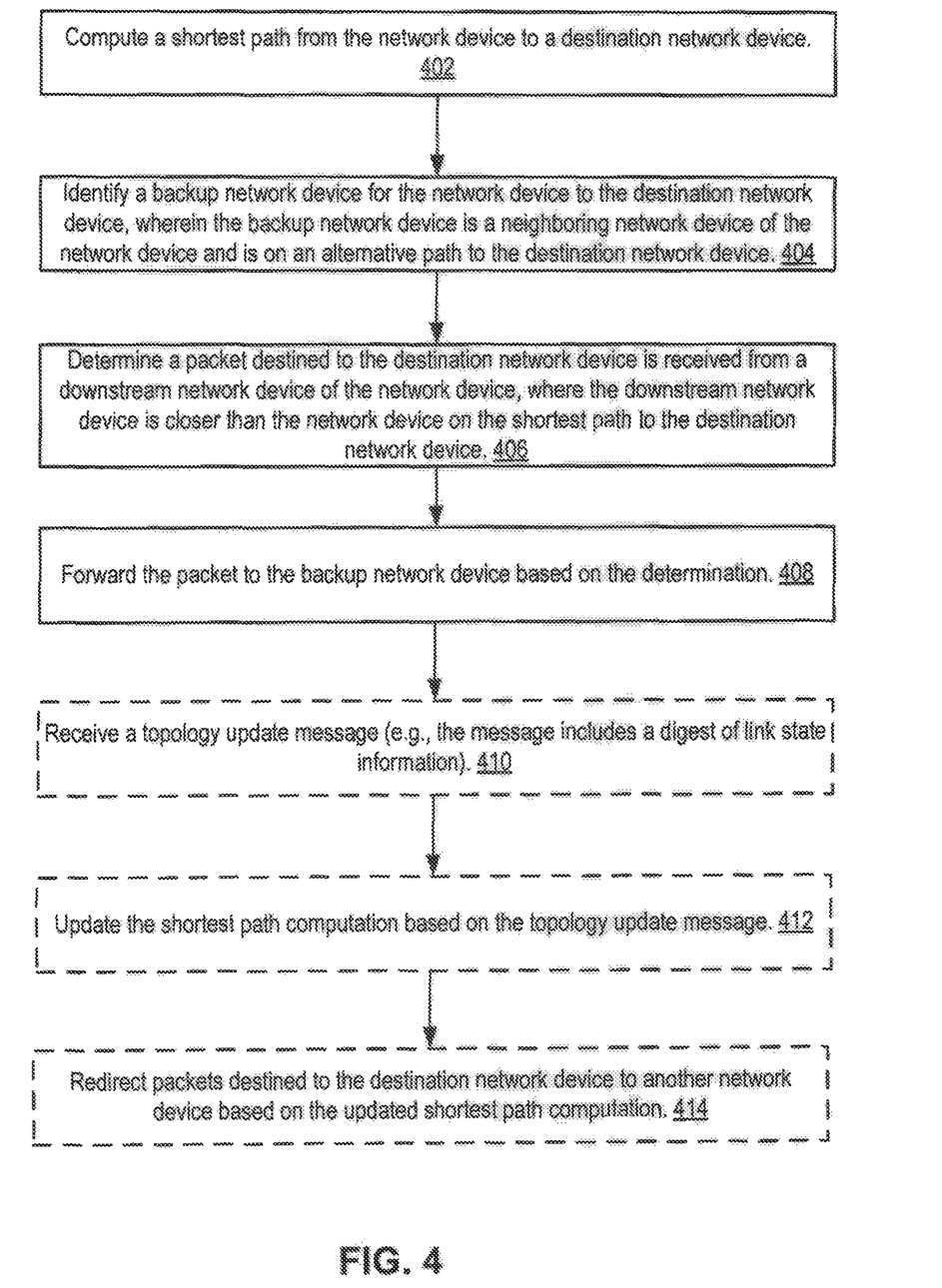
FIG. 4 is a flow diagram showing the operations to forward downstream packets to a backup node per some embodiments of the invention.

FIG. 4 is a flow diagram showing the operations to forward downstream packets to a backup node per some embodiments of the invention. Method 400 may be performed by a network device (e.g., node N discussed herein above) in a communications network.

At reference 402, the network device computes a shortest path from the network device to a destination network device. The network device may use a variety of SPF algorithms to identify the shortest path to the destination node. At reference 404, the network device identifies a backup network device for the network device to the destination network device, wherein the backup network device is a neighboring network device of the network device and is on an alternative path to the destination network device. Note that the identification of the backup network device may occur during the computation of the shortest path as discussed herein above.

In one embodiment, the backup network device is a loop-free alternate (LFA) network device for the network device to the destination network device. The LFA network device is on a loop-free path to the destination network device. The LFA network device comprises a regular LFA node discussed herein above.

In one embodiment, the backup network device is a topology independent loop-free alternate (Ti-LFA) network device, and the Ti-LFA network device is determined using segment routing as discussed herein above relating to FIG. 3A.

In one embodiment, the backup network device is a remote loop-free alternate (rLFA) network device for the network device to the destination network device. A packet that is destined to the destination network device, and that is forwarded to the rLFA network device, will be forwarded to the destination network device at the rLFA network device through a tunnel as discussed herein above relating to FIG. 3B.

At reference 406, the network device determines a packet destined to the destination network device is received from a downstream network device of the network device, where the downstream network device is closer than the network device on the shortest path to the destination network device. Note that the network device perceives the packet being received from a downstream network device, and that perception may be due to its view of the network topology having not been updated as discussed herein above relating to FIG. 1C.

At reference 408, the network device forwards the packet to the backup network device based on the determination. As discussed herein above, the forwarding to the backup network device avoids micro-loop and traffic congestion.

At reference 410, the network device receives a topology update message. The topology update message includes a digest of link state information of the communications network in one embodiment. The topology update and the generated topology update message are due to a bidirectional fault detection (BFD) by a PLR node in one embodiment, as discussed herein above.

At reference 412, the network device updates the shortest path computation based on the topology update message. For example, by comparing the received digest of the link state information and its local copy of the link state information, the network device determines the new network topology, and it may compute the shortest paths to various destination network devices based on the new network topology.

At reference 414, the network device redirects packets destined to the destination network device to another network device based on the updated shortest path computation. The redirection occurs when the other network device is identified to be the network device on the shortest path to the destination network device based on the updated network topology.

Note that operations at references 410-414 are optional for embodiments of the invention. These operations are performed periodically as a part of network management, and they may be performed concurrently as the operations at references 406-408.

Figure 5:
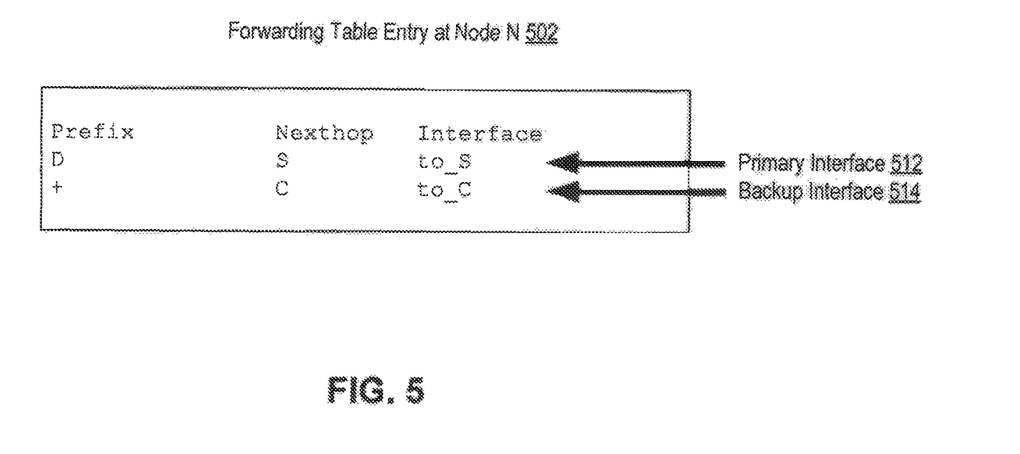
FIG. 5 shows a segment of a forwarding table per one embodiment of the invention.

In some embodiments, the network device uses a forwarding table to forward packets to other network devices including the backup network device. FIG. 5 shows a segment of a forwarding table per one embodiment of the invention. A forwarding table entry at node N is shown at reference 502. The forwarding table entry is indexed with a routing prefix (e.g., a subnet mask), and the prefix is for node D. Each forwarding table entry in the forwarding table may be identified with a prefix, indicating the forwarding is for packets with the identified destination.

The forwarding table entry includes a next hop, which is the next node that the packet is supposed to be forwarded to. The forwarding table entry also includes an interface (also referred to as port), through which packets destined to the prefix is to be forwarded. The forwarding table entry indicates the primary and backup next hops and their corresponding interfaces. In this example, node N has a primary next hop being node S and backup next hop being node C, and their corresponding interfaces are primary and backup interfaces at references 512 and 514. As discussed herein above, when the network device determines that a packet is received from a downstream network device for a destination network device, it identifies the backup interface, which is coupled to the link to the backup network device and forwards the packet towards the backup network device.

Figure 6:
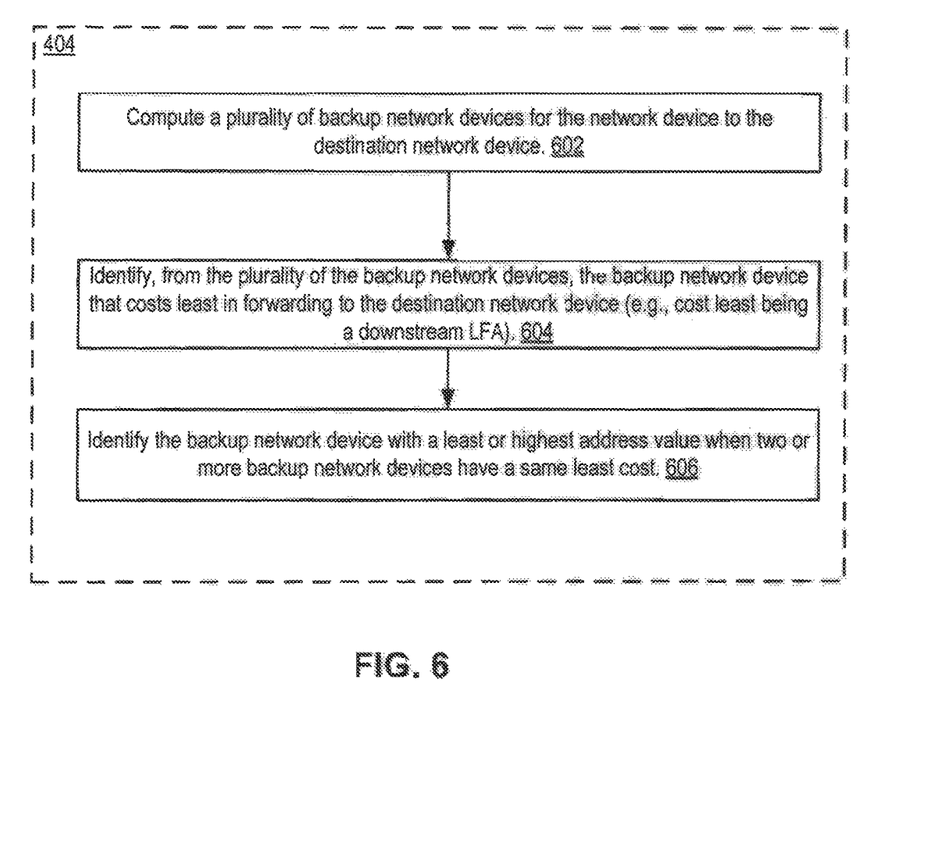
FIG. 6 is a flow diagram showing the operations to identify a backup network device from a plurality of network devices per some embodiments of the invention.

In some embodiments, multiple backup network devices may be available for a destination network device. FIG. 6 is a flow diagram showing the operations to identify a backup network device from a plurality of network devices per some embodiments of the invention. The operations in FIG. 6 may be an embodiment of operations of reference 404.

At reference 602, a network device (e.g., node N) computes a plurality of backup network devices for the network device to the destination network device. The plurality of backup network devices may include one or more of a regular LFA network device, a Ti-LFA network device, or a rLFA network device as discussed herein above.

At reference 604, the network device identifies, from the plurality of backup network devices, the backup network device that costs the least in forwarding to the destination network device. In some embodiments, two or more backup network devices are the least cost network devices in forwarding to the destination network device. The network device then identifies the backup network device with a least or highest address value at reference 606.

Through embodiments of the invention, micro-loops and network congestion during a network topology update may be minimized. These operations improve the packet forward efficiency and may result in achieving the quality of service (QOS) requirement per service level agreement (SLA) with a client. For example, embodiments of the invention make it easier to meet a service disruption duration requirement (e.g., less than 50 ms) since less packets are lost during the network topology update.

Embodiments of the invention is a "lightweight" improvement leveraging existing technologies. IP fast re-route (IP-FRR) has been implemented broadly for packet forwarding in a communications network. The backup nodes are often computed and identified during the IFFRR computation to identify the SPF paths to destination nodes. Embodiments of the invention utilize the pre-computed backup nodes upon a node receiving packets from a downstream node, thus additional/alternative operations over existing technologies are insignificant and easy to implement. Furthermore, embodiments of the invention apply broadly to both local and remote micro-loops and the unified approach to resolve micro-loops is advantageous over prior methods that resolve local and remote micro-loops in different means.

A Network Device Implementing Embodiments of the Invention

Figure 7:
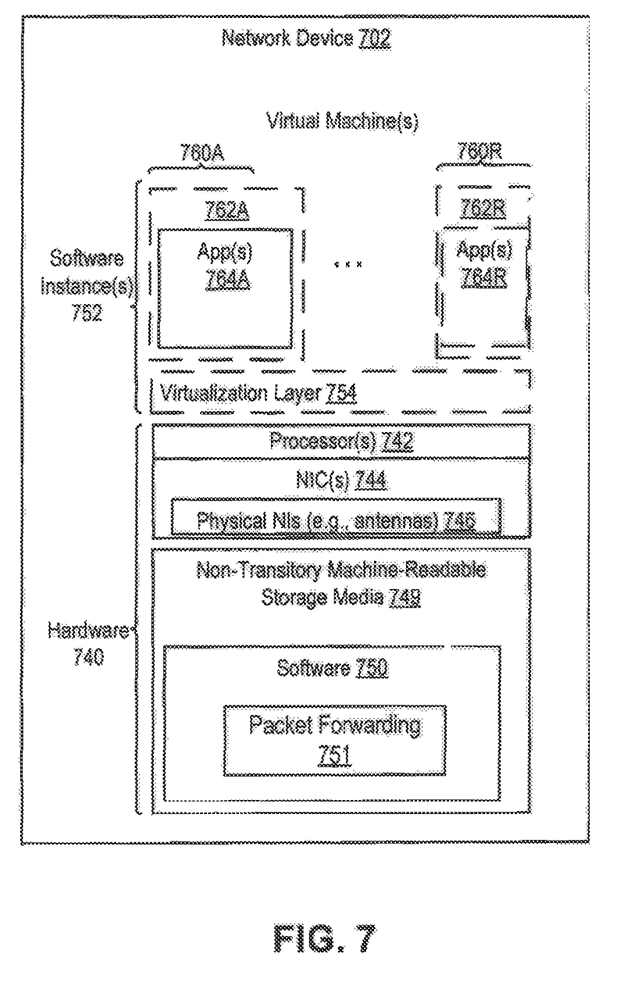
FIG. 7 shows a network device implementing the packet forwarding per one embodiment of the invention.

FIG. 7 shows a network device implementing the packet forwarding per one embodiment of the invention. The network device 702 may be implemented using custom application-specific integrated-circuits (ASICs) as processors and a special-purpose operating system (OS), or common off-the-shelf (COTS) processors and a standard OS.

The network device 702 includes hardware 740 comprising a set of one or more processors 742 (which are typically COTS processors or processor cores or ASICs) and physical NIs 746, as well as non-transitory machine-readable storage media 749 having stored therein software 750. During operation, the one or more processors 742 may execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment, the virtualization layer 754 represents a hypervisor (sometimes referred to as a virtual machine monitor (VMM)) or a hypervisor executing on top of a host operating system, and each of the sets of applications 764A-R run on top of a guest operating system within an instance 762A-R called a virtual machine (which may in some cases be considered a tightly isolated form of software container) that run on top of the hypervisor—the guest operating system and application may not know that they are running on a virtual machine as opposed to running on a "bare metal" host network device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The software 750 contains a packet forwarding system 751 that performs operations described with reference to FIGS. 1-6. The packet forwarding system 751 may be instantiated within the applications 764A-R. The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network device 760A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address).

Some of the embodiments contemplated herein above are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a network device in a communications network, the method comprising:
   computing a shortest path from the network device to a destination network device;
   identifying a backup network device for the network device to the destination network device, wherein the backup network device is a neighboring network device of the network device and is on an alternative path to the destination network device, and wherein the backup network device is identified during computation of the shortest path from the network device to the destination network device;
   determining that a packet destined to the destination network device is received from a downstream network device of the network device, wherein the downstream network device is closer than the network device on the shortest path to the destination network device; and
   forwarding the packet to the backup network device based on the determination.

2. The method of claim 1, wherein the backup network device is a loop-free alternate (LFA) network device for the network device to the destination network device, and wherein the LFA network device is on a loop-free path to the destination network device.

3. The method of claim 1, wherein the backup network device is a topology independent loop-free alternate (Ti-LFA) network device, and wherein the Ti-LFA network device is determined using segment routing.

4. The method of claim 1, wherein the backup network device is a remote loop-free alternate (rLFA) network device for the network device to the destination network device, and wherein the packet is forwarded to the destination network device through a tunnel.

5. The method of claim 1, wherein identifying the backup network device comprises:
   computing a plurality of backup network devices for the network device to the destination network device; and
   identifying, from the plurality of the backup network devices, the backup network device that costs least in forwarding to the destination network device.

6. The method of claim 5, wherein identifying the backup network device further comprises:
   identifying the backup network device with a least or highest address value when two or more backup network devices have a same least cost.

7. The method of claim 1, wherein the method comprises:
   receiving a topology update message; and
   updating the shortest path computation based on the topology update message.

8. The method of claim 7, wherein the topology update message includes a digest of link state information of the communications network.

9. The method of claim 7, further comprising:
   redirecting packets destined to the destination network device to another network device based on the updated shortest path computation.

10. The method of claim 1, wherein forwarding the packet to the backup network device comprises identifying an interface of the network device to the backup network device using a forwarding table of the network device.

11. A network device, comprising:
   a processor and computer-readable storage medium that provides instructions that, when executed by the processor, cause the network device to perform:

computing a shortest path from the network device to a destination network device;

identifying a backup network device for the network device to the destination network device, wherein the backup network device is a neighboring network device of the network device and is on an alternative path to the destination network device, and wherein the backup network device is identified during computation of the shortest path from the network device to the destination network device;

determining that a packet destined to the destination network device is received from a downstream network device of the network device, wherein the downstream network device is closer than the network device on the shortest path to the destination network device; and forwarding the packet to the backup network device based on the determination.

12. The network device of claim 11, wherein the backup network device is a loop-free alternate (LFA) network device for the network device to the destination network device, and wherein the LFA network device is on a loop-free path to the destination network device.

13. The network device of claim 11, wherein the backup network device is a topology independent loop-free alternate (Ti-LFA) network device, and wherein the Ti-LFA network device is determined using segment routing.

14. The network device of claim 11, wherein the backup network device is a remote loop-free alternate (rLFA) network device for the network device to the destination network device, and wherein the packet is forwarded to the destination network device through a tunnel.

15. The network device of claim 11, wherein the network device is to further perform:

receiving a topology update message; and updating the shortest path computation based on the topology update message.

16. A non-transitory computer-readable storage medium that provides instructions that, when executed by a processor of a network device, cause the network device to perform:

computing a shortest path from the network device to a destination network device;

identifying a backup network device for the network device to the destination network device, wherein the backup network device is a neighboring network device of the network device and is on an alternative path to the destination network device, and wherein the backup network device is identified during computation of the shortest path from the network device to the destination network device;

determining that a packet destined to the destination network device is received from a downstream network device of the network device, wherein the downstream network device is closer than the network device on the shortest path to the destination network device; and forwarding the packet to the backup network device based on the determination.

17. The non-transitory computer-readable storage medium of claim 16, wherein the backup network device is a loop-free alternate (LFA) network device for the network device to the destination network device, and wherein the LFA network device is on a loop-free path to the destination network device.

18. The non-transitory computer-readable storage medium of claim 16, wherein identifying the backup network device comprises:

computing a plurality of backup network devices for the network device to the destination network device; and identifying, from the plurality of the backup network devices, the backup network device that costs least in forwarding to the destination network device.

19. The non-transitory computer-readable storage medium of claim 18, wherein identifying the backup network device further comprises:

identifying the backup network device with a least or highest address value when two or more backup network devices have a same least cost.

20. The non-transitory computer-readable storage medium of claim 16, wherein forwarding the packet to the backup network device comprises identifying an interface of the network device to the backup network device using a forwarding table of the network device.

* * * * *